(No Model.) 3 Sheets—Sheet 1.
F. MYERS.
MACHINE FOR TRIMMING, CHAMFERING, AND CROZING STAVES.
No. 329,846. Patented Nov. 3, 1885.
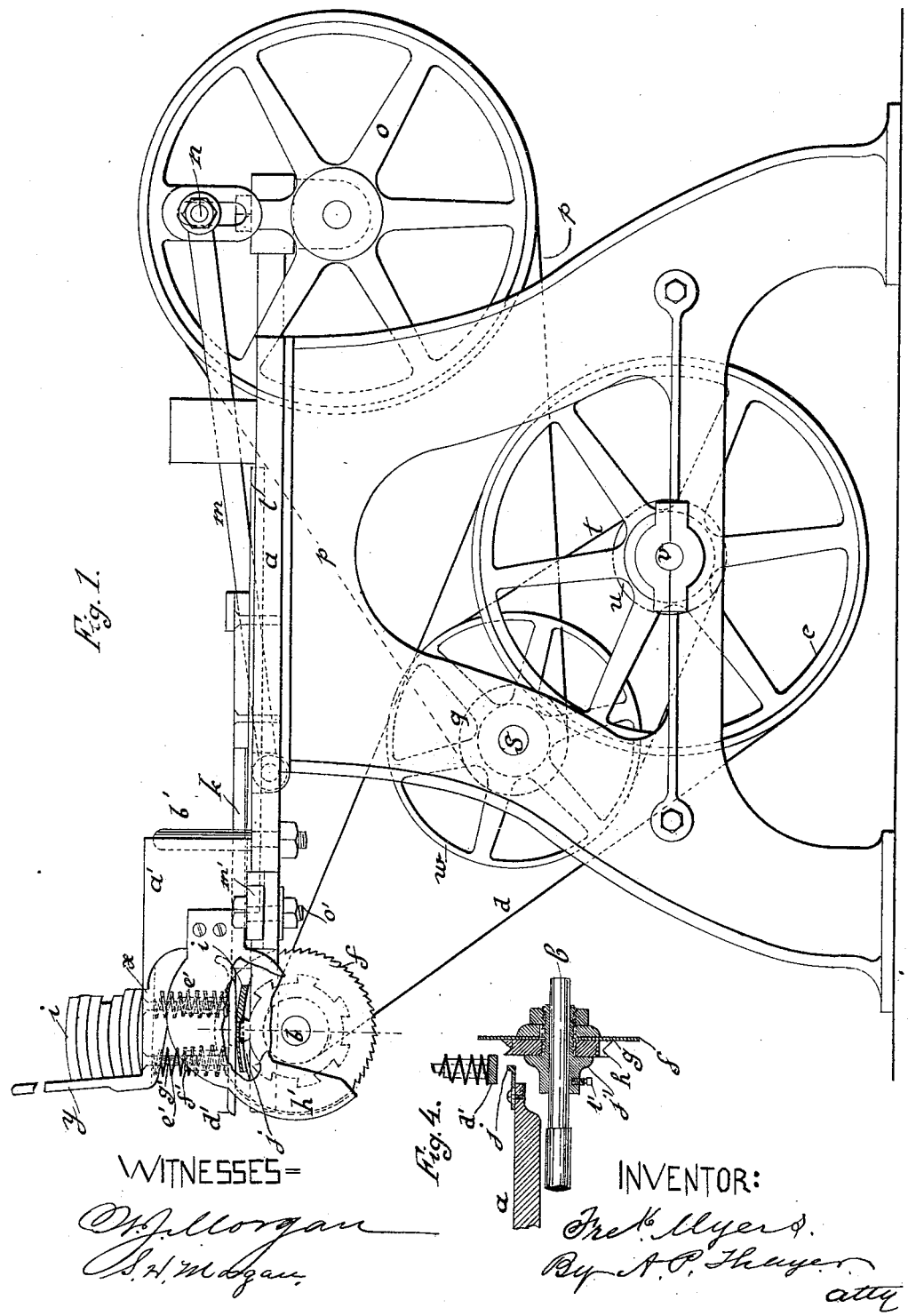

(No Model.) 3 Sheets—Sheet 2.
F. MYERS.
MACHINE FOR TRIMMING, CHAMFERING, AND CROZING STAVES.
No. 329,846. Patented Nov. 3, 1885.
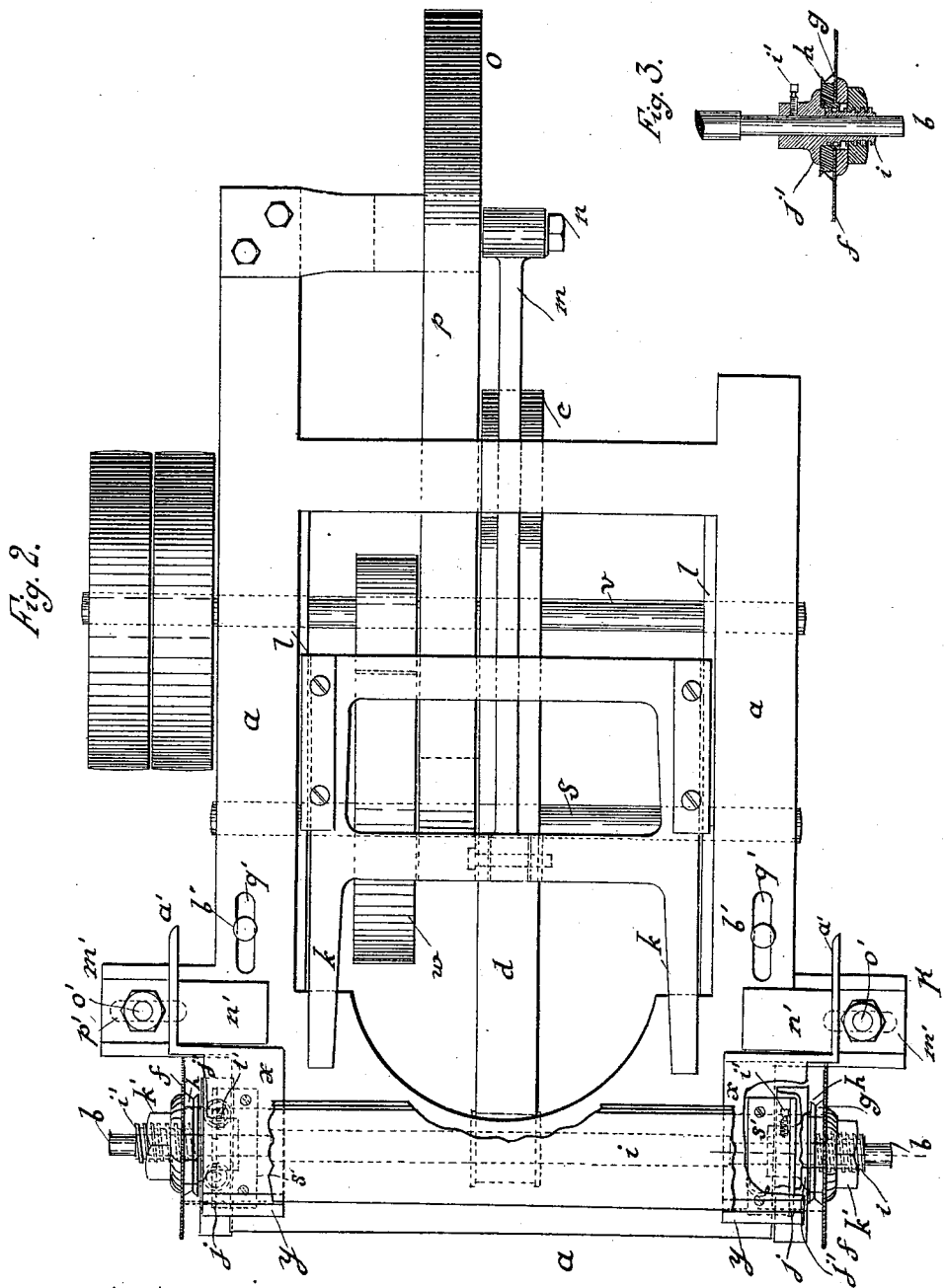

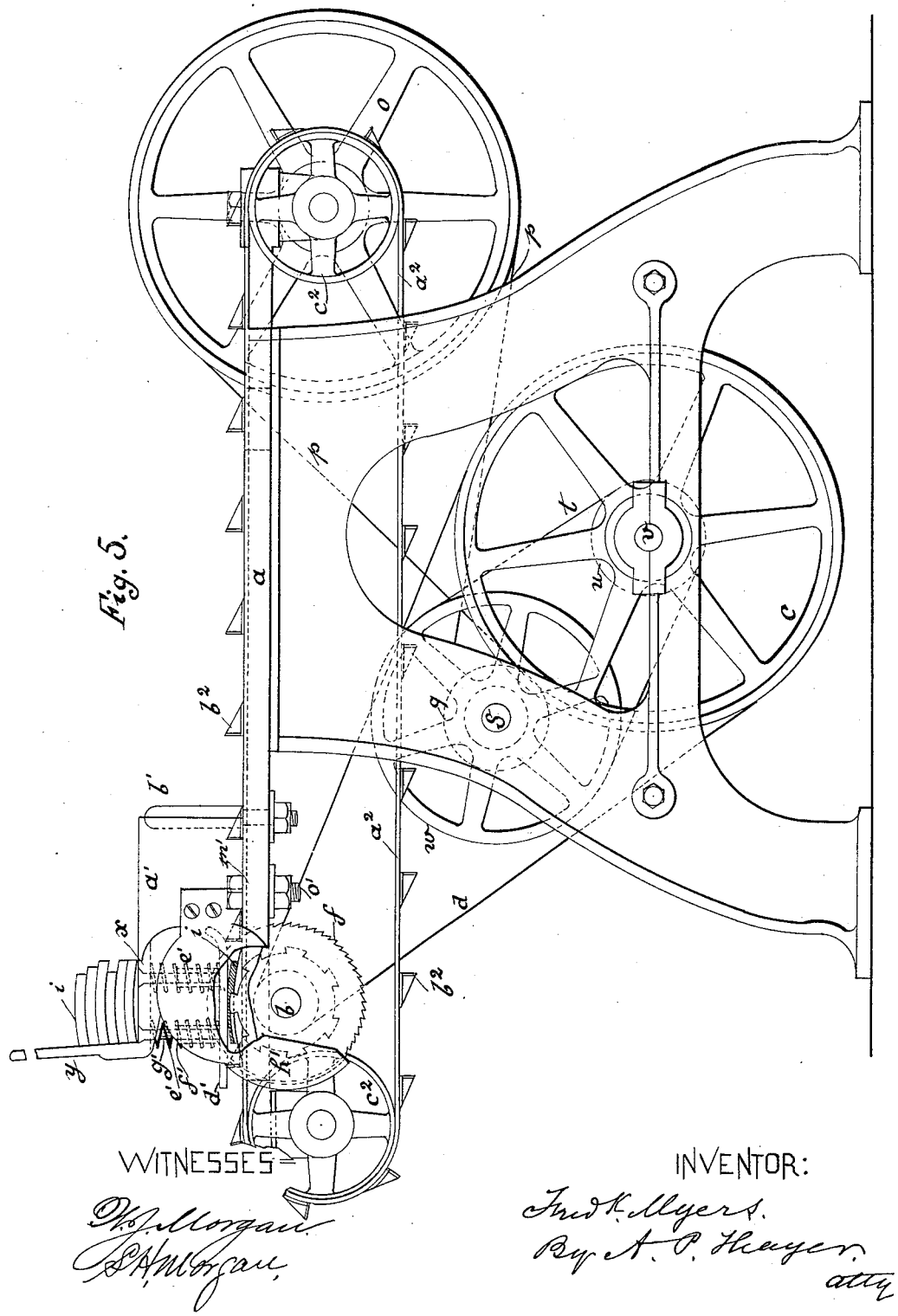

UNITED STATES PATENT OFFICE.

FREDERICK MYERS, OF NEW YORK, N. Y.

MACHINE FOR TRIMMING, CHAMFERING, AND CROZING STAVES.

SPECIFICATION forming part of Letters Patent No. 329,846, dated November 3, 1885.

Application filed January 15, 1884. Serial No. 117,590. (No model.)

*To all whom it may concern:*

Be it known that I, FREDERICK MYERS, a citizen of the United States, residing at New York city, in the county and State of New York, have invented new and useful Improvements in Machines for Trimming, Chamfering, and Crozing Barrel-Staves, of which the following is a specification.

My invention consists of improvements in the construction and arrangements of machines for sawing barrel-staves off at the ends, for cutting them to the proper length, and simultaneously chamfering the chines and cutting the crozes, which said improvements are hereinafter fully described, reference being made to the accompanying drawings, in which—

Figure 1 is a side elevation of my improved machine with a part broken out. Fig. 2 is a plan also with some parts broken out. Figs. 3 and 4 are details in section, and Fig. 5 is a side elevation with an endless feeder.

On any suitable bench or table, $a$, I arrange a saw and cutter-mandrel, $b$, at or near one end of said table, connecting it with a main driving-pulley, $c$, by the belt $d$, and arranging a cutting-off saw, $f$, on said mandrel, near each end, but as far apart as the required length of the staves, with a chine-cutter, $g$, and a croze-cutter, $h$, on the inner side of each saw, said saws and cutters being so arranged with relation to the table that the staves $i$, being pushed along on the table between the saws, will be trimmed off at the ends to the required length, and the staves will pass over the chine and croze cutters and will be properly chined and crozed on the under side thereby. The saws are of larger diameter than the croze and chine cutters to cut through the staves; but the said chine and croze cutters reach above the table and a curved gage, $j$, thereon only sufficiently to cut the chines and crozes to the proper depth. Instead of causing the staves to pass along the plain flat surface of the table in passing over the cutters, I provide the said curved gages $j$ alongside of the cutters, which gages are convex on the upper edge, which is curved to the radius of a barrel, and the highest point is in line with the highest point of the cutters, and directly over the mandrel $b$, to gage the staves thereto in passing over the cutters. The object of these gages is to gage staves that are curved transversely to the curvature of the barrel, so as to cut the chines and crozes of uniform depth across the concave sides of the staves, which cannot be done with such cutters when moved along the flat surface of the table. Flat staves may be dressed equally as well with these guides as without them.

To feed the staves along the saws and cutters, I use a feeding-slide, $k$, arranged to work on guideways $l$ of the table, and connected by a rod, $m$, with a crank-pin, $n$, of a wheel, $o$, located at the opposite end of the table, and having a driving-belt, $p$, running on it from a small pulley, $q$, on a counter-shaft, $s$, driven by a belt, $t$, from a small pulley, $u$, on the driving-shaft $v$ and running on the large pulley $w$ of the counter-shaft.

To supply the staves to the feeder, I have provided benches $x$ over the saws and cutters, on which to place the staves $i$ in piles against the backs $y$, to be dropped therefrom one by one by the attendant in the order of the movements of the feeder down in front of the saws and cutters and between the benches and the stops $b'$, and also between the end guides, $a'$. The stops $b'$ prevent the staves from being drawn back on the pusher, in case they may happen to fall on it, and the end guides, $a'$, control the staves lengthwise with relation to the saws.

The feeder pushes the staves one by one along to the saws and cutters, forcing them under the pressers $d'$, which are held down by springs $e'$ to hold the staves to the cutters. The pressers have socket-studs $f'$, extending upward, and receiving the stud-pins $g'$, extending downward from the benches to hold the pressers against the tendency of the staves to carry them backward.

The benches $x$ each have a saw-guard, $h'$, attached to them to cover the saws to protect them and the saws, and said benches, saws, and cutters are adjustable toward and from each other to set the machine for staves of different lengths.

The saws and cutters are fitted to a sleeve, $i'$, having a collar, $j'$, against which they are clamped by the nuts $k'$, and the sleeves are adjustable along the mandrel and have a set-screw, $l'$, to secure them.

The benches $x$ and end guides, $a'$, are attached to the base-plates $m'$, which are fitted to shift forward and backward in the recesses $n'$ of the table, and are secured by the bolts $o'$, which also shift along slotted holes $p'$ of the table.

The stops $b'$ are also adjustable along the slotted holes $q'$ toward and from the benches, as may be required. The convex gages $j$ have a base-flange, $s'$, bolted down on the table to attach them to the table.

It may be preferred in some cases to substitute an endless belt, $a^2$, with pushing studs or lugs $b^2$ for the pusher $k$ as a means of feeding the staves, which will feed more continuously and regularly than the pusher, said belt being arranged on suitable carrying-pulleys, $c^2$, at each end of the machine, with which the driving-pulley $o$ may be suitably connected at one end to employ the same arrangement of driving-gear between said pulley $o$ and the main shaft as is used with the pusher. Instead of using a single wide belt, $a^2$, it will be preferred to use two narrow ones, to be located near each side of the top or bed of the machine.

The feed-table, front, side, and rear guides, and pusher form the subject-matter of a claim in my prior application for a patent on improvements in barrel-making machines, filed November 14, 1883, No. 111,733, and are not specially claimed herein.

What I claim, and desire to secure by Letters Patent, is—

1. The combination, with the trimming-saws $f$ and chine and croze cutters $g$ $h$, arranged in stationary bearings, and with a horizontal feed-table and feeder, of the convex guides $j$, arranged coincidently with the cutters $g$ $h$, for gaging transversely-curved staves to the said chine and croze cutters, and the pressers $d'$, arranged over said guides, substantially as described.

2. In a stave-trimming, chine-cutting, and crozing machine, a saw and chine and croze cutter for each end of the staves, mounted on sleeves $i'$, fitted adjustably along the mandrel for adjusting said saws and cutters for staves of different lengths, in combination with feed-benches having correspondingly-adjustable side guides, $a'$, for the ends of the staves, and with a feeder, substantially as described.

3. The combination of the stave-holding benches $x$, having supporting-backs $y$ above the rests for the staves, and also having end guides, $a'$, and the stops $b'$, located in front of the benches, with the feeder $k$, and with the trimming-saws and the chine and croze cutters of a stave-trimming, chine-cutting, and crozing machine, constructed and arranged substantially as described.

4. In a stave-trimming and chine and croze cutting machine having saws and chine and croze cutters fitted adjustably on the mandrel $b$, and also having adjustable feed-benches $x$, the saw-guards $h'$, fitted to the saws $f$ and attached to the adjustable feed-benches, substantially as described.

In witness whereof I have hereunto signed my name in the presence of two subscribing witnesses.

FREDERICK MYERS.

Witnesses:
W. J. MORGAN,
S. H. MORGAN.